United States Patent
Kalte et al.

(10) Patent No.: US 12,079,601 B2
(45) Date of Patent: Sep. 3, 2024

(54) COMPUTER-IMPLEMENTED METHOD FOR CREATING A HIERARCHICAL BLOCK DIAGRAM

(71) Applicant: dSPACE GmbH, Paderborn (DE)

(72) Inventors: Heiko Kalte, Paderborn (DE); Dominik Lubeley, Paderborn (DE)

(73) Assignee: DSPACE GMBH, Paderborn (DE)

( * ) Notice: Subject to any disclaimer, the term of this patent is extended or adjusted under 35 U.S.C. 154(b) by 139 days.

(21) Appl. No.: 18/066,308

(22) Filed: Dec. 15, 2022

(65) Prior Publication Data

US 2023/0195430 A1 Jun. 22, 2023

(30) Foreign Application Priority Data

Dec. 17, 2021 (DE) .......................... 102021133736.4
Dec. 17, 2021 (EP) ..................................... 21215702

(51) Int. Cl.
*G06F 9/44* (2018.01)
*G06F 8/34* (2018.01)
*G06F 8/35* (2018.01)

(52) U.S. Cl.
CPC . *G06F 8/34* (2013.01); *G06F 8/35* (2013.01)

(58) Field of Classification Search
CPC ..................................... G06F 8/34; G06F 8/35
USPC ....................................................... 717/102
See application file for complete search history.

(56) References Cited

U.S. PATENT DOCUMENTS

| | | | |
|---|---|---|---|
| 7,086,030 B1 | 8/2006 | Stroomer et al. | |
| 8,201,099 B1* | 6/2012 | Osbourn | G06F 8/34 715/713 |
| 2002/0089541 A1* | 7/2002 | Orbanes | G06F 8/34 715/764 |
| 2007/0074286 A1* | 3/2007 | Wendling | G06F 8/34 726/21 |
| 2009/0241081 A1 | 9/2009 | Smith et al. | |
| 2019/0179974 A1 | 6/2019 | El-Zein | |

* cited by examiner

*Primary Examiner* — Chuck O Kendall
(74) *Attorney, Agent, or Firm* — Leydig, Voit & Mayer, Ltd.

(57) ABSTRACT

A computer-implemented method for creating a hierarchical block diagram in a graphical development environment includes: automatically creating a hierarchical black box for a respective further subsystem block. The hierarchical black box is configured to resolve a corresponding hierarchical level when selected by a user. The automatic creation is carried out via a callback function. The hierarchical black box has the following features: at least one interface description and/or graphical representation of the inputs/outputs of the respective further subsystem block in its hierarchical level, which the respective further subsystem block previously also occupied; at least one reference to model content for the respective further subsystem block, comprising further black boxes for the further subsystem blocks in the subordinate hierarchical levels; parameters that the respective further subsystem block previously also had; and generated source code of the respective further subsystem block.

14 Claims, 1 Drawing Sheet

COMPUTER-IMPLEMENTED METHOD FOR CREATING A HIERARCHICAL BLOCK DIAGRAM

CROSS-REFERENCE TO PRIOR APPLICATIONS

This application claims benefit to German Patent Application No. DE 102021133736.4 and European Patent Application No. EP 21215702.8, filed on Dec. 17, 2021, each of which is hereby incorporated by reference herein.

FIELD

The invention relates to a computer-implemented method for creating a hierarchical block diagram in a graphical development environment. The invention also relates to a data processing device and to a computer program product.

BACKGROUND

In the field of hardware-in-the-loop (HIL) simulation and rapid control prototyping (RCP) systems for real-time simulations, graphical modeling environments have become well established. In this respect, a real-time application for a particular task period can generally be simulated offline in the simulation model using virtual stimuli and virtual instruments, or online on the actual simulator. For the actual simulation, the graphical model is first translated, into C code for a processor, for example, or into VHDL code for an FPGA, for example. In both cases, i.e., with both the processor and the FPGA, the modeling is carried out on the basis of signals and blocks/subsystems, which execute an operation on one or more signals and generate one or more new signals. The order of execution is based on the signal flow. In this case, a block/subsystem may contain any number of subordinate blocks/subsystems. Blocks/subsystems may be packaged into a library and thus be made updatable and be instanced multiple times. The use/instancing of a library block does not lead to a reduction in the number of blocks in the model since, for example, a consistent copy of the library block is always generated in the model so that the modeling environment can be simulated offline.

To allow a block/subsystem to be used in a variable manner, whether independently or from a library, there are two key properties of a block/subsystem. In this context, the model root, i.e., the uppermost level of the block diagram, should also be considered a separate block/subsystem. The first property is that the block/subsystem is parameterizable. In this case, a block/subsystem has its own variables workspace. Variables from hierarchically superordinate workspaces are also available, for example, in Simulink in the workspace of a subordinate block, unless they have been overwritten by an identical variable identifier. This property differs significantly from, for example, interleaved C functions in which only passed variables are available. It constitutes part of the powerful capabilities of graphical modeling but, on the other hand, it also leads to an extensive data and management structure. The second property is that the block/subsystem has callbacks. A callback function can be defined for each modeling action, for example initializing the block/subsystem or copying the block/subsystem. Other parameters used can thus be calculated depending on the block parameters, for example in the block Init function. This results in great flexibility and many different intervention points, but also leads to a high runtime for initializing a block/subsystem. In summary, this flexibility comes at a cost in the form of longer execution periods for modeling operations (open model, shift blocks, copy, insert), initializations, and builds, proportionally to the number of blocks. At the same time, graphical modeling allows developers to modularize and to scale to any size. Although, when graphical modeling began, a simple PID controller, for example, was implemented in a model having, for example, 10 blocks, today complete 10-block eDrive or power electronics solutions can be clicked together. Beneath these 10 blocks, however, there is then a deep hierarchy of tens of thousands of blocks, the result of which is the above-described increased execution periods proportionally to the number of blocks. Consequently, graphical modeling is reaching its limits owing to the inertia and inflexibility of the modeling tools—characteristics which increase proportionally to the number of blocks. This trend has only been taken into account to a limited extent in modern graphical modeling environments such as Simulink from MathWorks, with the S-function (C code black boxes) and 'model referencing' (shifting model components into external models) capabilities. S-functions cannot simply be created from subsystems in an automated manner; they have to be manually created and adapted. Model referencing does allow the above-stated execution periods to be improved but it severely limits flexibility. What is missing is the seamless, automatic transition to abstraction of model hierarchies for a more fluid workflow while retaining the flexibility (block initialization, callbacks, etc.) of graphical modeling.

SUMMARY

In an exemplary embodiment, the present invention provides a computer-implemented method for creating a hierarchical block diagram in a graphical development environment comprising at least one subsystem block, in which the at least one subsystem block is located on a first hierarchical level and further subsystem blocks of the at least one subsystem block are located on subordinate hierarchical levels. The at least one subsystem block is parameterizable and has at least one callback function, wherein callback functions define commands that are executed in response to particular modeling activities. To reduce hierarchical levels of the at least one subsystem block, at least one hierarchical black box is created for the at least one subsystem block, wherein a reduction is carried out from the lowest hierarchical level upward. The method includes: automatically creating a hierarchical black box for a respective further subsystem block, wherein the hierarchical black box is configured to resolve a corresponding hierarchical level when selected by a user, wherein the automatic creation is carried out via a callback function, and wherein the hierarchical black box has the following features: at least one interface description and/or graphical representation of the inputs/outputs of the respective further subsystem block in its hierarchical level, which the respective further subsystem block previously also occupied; at least one reference to model content for the respective further subsystem block, comprising further black boxes for the further subsystem blocks in the subordinate hierarchical levels; parameters that the respective further subsystem block previously also had; and generated source code of the respective further subsystem block.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
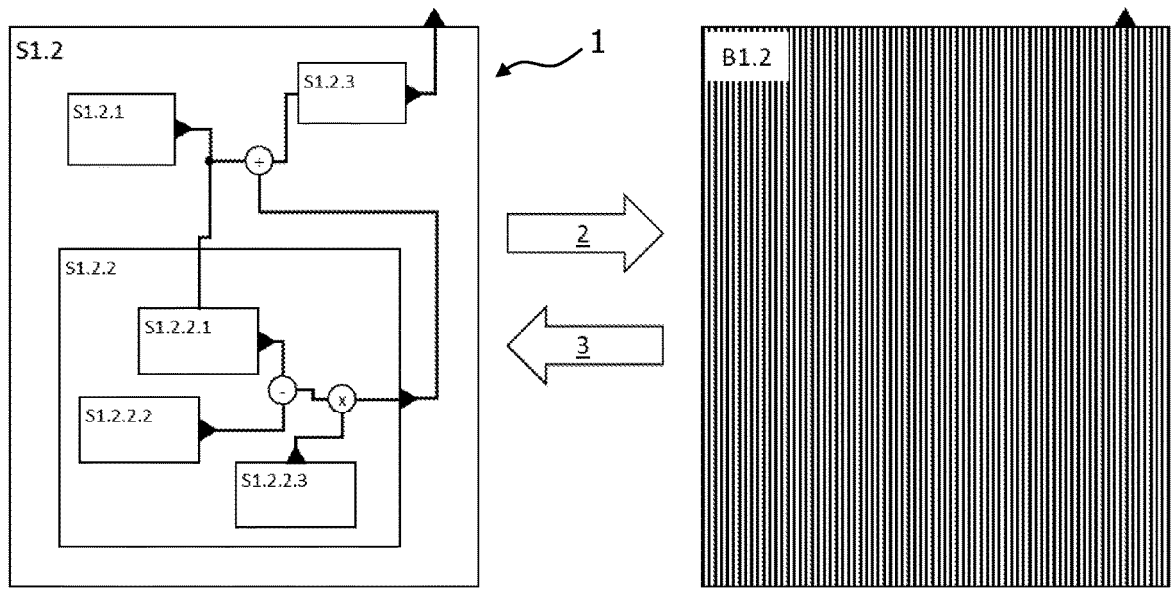
FIG. 1 is a block diagram showing an example subsystem in the form of a model on the left-hand side and in the form of a black box on the right-hand side, in accordance with an example embodiment of the invention.

Exemplary embodiments of the present invention provide a computer-implemented method in which the execution periods of model operations are shortened to allow for more powerful, more reactive graphical modeling.

According to one aspect, the invention provides a computer-implemented method for creating a hierarchical block diagram in a graphical development environment comprising at least one subsystem block, in which the subsystem block is located on a first hierarchical level and subsystem blocks of the subsystem block are located on subordinate hierarchical levels, the subsystem block is parameterizable and has at least one callback function, wherein callback functions define commands that are executed as a response to a particular modeling activity, wherein, to reduce hierarchical levels of the subsystem block, at least one hierarchical black box is created for the subsystem block, wherein a reduction is carried out from the lowest hierarchical level upward, wherein the method comprises the following steps:

automatically creating a hierarchical black box for a subsystem block, wherein the black box is configured such as to resolve a corresponding hierarchical level when selected by a user, wherein the automatic creation is carried out via a callback function, the black box has the following technical features:

at least one interface description and/or graphical representation of the inputs/outputs of the subsystem block in its hierarchical level, which the subsystem block previously also occupied, at least one reference to model content for the corresponding subsystem block, comprising further black boxes for the subsystem blocks in the subordinate hierarchical levels, parameters that the corresponding subsystem block previously also had, generated source code of the corresponding subsystem block.

The generated source code may be code in a programming language such as C or HDL code, or in a hardware description language such as VHDL or Verilog.

In a technically advantageous embodiment of the method, the step of automatically creating a hierarchical black box for a subsystem block comprises the following steps:

generating a source code for the subsystem block, wherein any wrapper code present around the actual function code is removed, generating a system function block on the basis of the generated source code without any wrapper code, wherein the system function block enables the access to system functions of the block diagram, wherein system functions specify how a block operates during different parts of a simulation, and the system function block allows additional parameters to be directly transferred to the system functions.

If code is generated from a subsystem block, in general the code generators generate wrapper code in the case of both C code and HDL code. In doing so, they assume that the code might need to be executed independently, as if it were a self-contained model. Tasks, etc., are arranged in the wrapper code in the process. However, only the function code is needed for the black box, which is included in the model but is not intended to be a model that can be run by itself. Therefore, the wrapper code around the actual function code is removed. A system function block should in particular be taken to be a function block that enables the access to system functions of the block diagram. In this regard, system functions specify how a block operates during various parts of a simulation. In addition, the system function block allows additional parameters to be transferred directly to the system functions. For example, the system functions can be taken to be the S-functions provided within the Simulink graphical modeling environment from MathWorks. In the case of a processor model, the black boxes may thus consist of S-functions. This creates the advantages whereby code only has to be generated once for the S-functions. In addition, they only have to be compiled once if they have been left unchanged compared with the last compiling operation. The generating and compiling periods are reduced in each further model build.

In an advantageous enhancement, said precompiled S-functions are not actually linked statically before being executed to form the model, but are placed as dynamic libraries (.dll or .so under Linux) in relation to the real-time application. They are thus not dynamically linked until the runtime. This results in a real-time application composed of a set of hierarchical object code files. This leads to the advantage whereby only the subsystem—not the entire model—has to be compiled again if anything changes in a particular subsystem. Non-reduced models having hundreds of thousands of blocks require several minutes, if not hours, for a build. If only a small subsystem is changed, building the dynamic library thereof (.dll/.so) takes just a few seconds.

In a technically advantageous embodiment of the method, the step of automatically creating a hierarchical black box for a subsystem block comprises creating an HDL code black box, by the following steps:

replacing virtual signal lines with inports and outports, and shifting these ports from lower hierarchical levels to the uppermost subsystem hierarchical level and/or replacing inports and outports of the uppermost subsystem hierarchical level with interface blocks of the code generator being used, generating HDL code for the subsystem block, generating a hierarchical black box based on the HDL code.

In Simulink, for example, virtual signal lines may be taken to be Goto/From blocks that specifically form the virtual signal lines. In an example embodiment in which a Xilinx system is used, generated VHDL code can be used to generate the hierarchical black boxes. In Xilinx systems, the use of special blocks that assist with executing HDL code on the processor can also be provided.

In a technically advantageous embodiment of the method, the method comprises the additional step of:

encrypting the HDL code.

In a technically advantageous embodiment of the method, the method comprises the following additional steps:

storing an additionally pre-synthesized network list, wherein the network list is synthesized from the generated HDL code, wherein the synthesis comprises the following steps:

generating a synthesized network list, storing the synthesized network list, integrating the synthesized network list in the black box, wherein the HDL code is also used for an offline simulation, and the fully synthesized network list is used for generating the code.

The advantage here is that, in an FPGA build, the black box is sped up by the additionally stored, pre-synthesized network lists.

In a technically advantageous embodiment of the method, the method comprises encrypting the network list.

In a technically advantageous embodiment of the method, the black box contains a reference to an implementation.

In a technically advantageous embodiment of the method, the black box comprises an original model, or the black box comprises a created and referenced copy of the original model, and the method comprises the following additional steps:

opening a subsystem via an opening callback function, restoring and displaying the editable original model of the uppermost black box hierarchical level.

In a technically advantageous embodiment of the method, the black box contains an offline simulation model.

In a technically advantageous embodiment of the method, the black box comprises, as parameters, a change frequency and/or the number of changes made.

In a technically advantageous embodiment of the method, the method comprises the following additional steps:

regenerating the hierarchical black box when at least one of the following conditions is satisfied:

when, in the event of an opening callback function or closing callback function, it is detected in the model that individual subsystems have not yet been reduced, when, while a subsystem is being closed via a closing callback function, it is established that the subsystem has been modified, when library blocks that have been used in the black boxes are updated, when input data types and/or input widths are changed.

In a technically advantageous embodiment of the method, global conditions are taken into account in the callback functions in order to reduce the frequency of regenerations, wherein a regeneration is only carried out when at least one of the following global conditions is fulfilled:

the amount of time since the last regeneration of the black box is longer than a particular amount of time (e.g., a particular number of minutes), the amount of time since the last change is longer than a particular amount of time (e.g., a particular number of minutes), the change frequency is lower than a particular value, the number of changes exceeds a particular value.

According to a further aspect, the invention provides a data processing device capable of carrying out the above-described method.

According to a further aspect, the invention provides a computer program product comprising commands which, when executed by a computer, cause the computer to carry out a method according to the invention.

Example embodiments of the invention are shown in the drawings and described in greater detail below.

FIG. 1 is a block diagram 1 showing an example subsystem block S1.2 in the form of a model on the left-hand side and in the form of a black box B1.2 on the right-hand side. FIG. 1 shows how an original subsystem block S1.2 is replaced with a black box B1.2 by creating 2 a hierarchical black box B1.2 for the subsystem block S1.2. This can be done, for example, when a user leaves the subsystem block S1.2. By way of example, the black box B1.2 is resolved 3 again when the user selects the corresponding subsystem block S1.2. The model S1.2 on the left-hand side consists of further subsystem blocks S1.2.1, S1.2.2, S1.2.3. The hierarchical black box B1.2 for the subsystem block S1.2 is created 2 via a callback function; commands that are executed as a response to a particular modeling activity can be defined via callback functions.

The method for creating a black box is implemented in a plurality of steps. In this regard, the creation differs slightly between processor models and FPGA models.

In the case of processor models, source code is first generated for the subsystem block S1.2. This can be done, for example, by way of a C code S-function. Depending on the code generation, unnecessary wrapper code (e.g., for task handling) around the actual function code is removed. Lastly, a block is generated on the basis of the generated code without any wrapper components. This may be an S-function block in a Matlab Simulink environment, for example.

In the case of FPGA models, the black boxes B1.2 may be HDL black boxes, for example. The advantages here are that, for the HDL black boxes, HDL code only has to be generated once and one network list has to be generated. The generation and synthesis periods are reduced in each further model build if the corresponding subsystem block remains unchanged.

In one example embodiment, virtual signal lines, e.g., Goto/From in Simulink, are first replaced with inports and outports, and these ports are shifted from lower hierarchical levels to the uppermost block/subsystem hierarchical level. Inports and outports of the uppermost subsystem block S1.2 hierarchies may also be replaced. In the case of Xilinx, for example, this can be done by the Xilinx System Generator Gateway In and Out Ports. For the HDL coder from MathWorks, for example, this step can be omitted. A code generation block may also be expanded. In the case of Xilinx, this is the Xilinx System Generator block, for example. For the HDL coder from MathWorks, for example, this step can again be omitted. Next, HDL code is generated for the subsystem block.

Afterward, a black box based on the HDL sources is generated. In the case of Xilinx, for example, the generated VHDL code can be used for this purpose. In the process, the VHDL sources are always used for the offline simulation. The VHDL sources can also be synthesized again during each synthesis of the model as a whole. In addition, the VDHL code may be encrypted.

To speed up the black box B1.2 in the FPGA build, additionally stored, pre-synthesized network lists may be provided. The network lists are generated from the generated HDL sources and integrated in the black box B1.2. In the process, the HDL code is also used for the offline simulation. The fully synthesized network list is used for generating the code.

Next, the black boxes B1.2 are prepared for interaction with the modeler. In preparation for the interactive modeling, the black boxes B1.2 are modified accordingly. In particular, this may entail inserting an opening callback function, which opens the black box B1.2 by replacing the black box B1.2 with its original subsystem block S1.2 and opening it. In this case, a closing callback function, which causes the subsystem block S1.2 to be replaced with the black box B1.2 again upon closure, is added to the original subsystem block S1.2.

As explained above, the model opening/closing callback, and for each subsystem S1.2 the opening/closing callback, has been used for this purpose (in Simulink: alternatively also the 'ParentClose' callback). To insert the callback function in the model, a plurality of mechanisms are possible. For example, an explicit call may be carried out, e.g., via dialog, button, or a command line/API call. In addition, a model reduction block, which lays missing callback functions when initialized during Model Init, may be inserted into the model.

In one example embodiment of the invention, the black box B1.2 shown schematically in FIG. 1 includes at least one interface description/graphical representation of the inputs/outputs of the block in its hierarchical level, which the subsystem block S1.2 previously also occupied, a reference to the model content for the corresponding subsystem block S1.2, comprising further black boxes for the lower subsystem blocks, parameters that the subsystem block S1.2 previously also had, and the generated HDL or C code of the subsystem block. In a further example embodiment, the black box may include a reference to the implementation/compilation and an offline simulation model. In addition, the black box B1.2 may include parameters that are evaluated by regeneration conditions of the callbacks. These parameters are also stored at the subsystem block S1.2 when a black box has not yet been regenerated on the basis of a condition, but rather is initially left in the model again as an original subsystem block S1.2. These parameters may, for example, be a last change or a last regeneration. In one example embodiment, a change frequency and the number of changes may be provided as parameters.

There are various conditions under which the hierarchical black boxes are generated again. For example, these conditions may be when an opening/closing callback function is detected in the model, and the model or the individual subsystem blocks S1.2 has/have not yet been reduced. A further condition may be a closing callback function of a subsystem block S1.2 if this subsystem block S1.2 has been modified. In addition, a regeneration condition may be when library blocks that have been used in the black boxes B1.2 have been updated. If a new version of a block library used in the subsystem blocks S1.2 is used, all the black boxes in which blocks of that library have been used have to be generated again. The black boxes to which this applies can be ascertained on the basis of the copy of the model comprising the original subsystems. The blocks are updated in the copy of the model comprising the original subsystems, e.g., in Simulink as early as with Open Model.

If input data types/widths are changed, the black boxes B1.2 are generated again. Since floating point is generally used for the modeling in processor models, this case occurs more often in FPGA modeling. In one example embodiment, an optional enhancement for FPGAs involves defining the interface widths in the black box B1.2 and the VDHL code thereof via a generic variable. This covers the most common case, in which a fixed point data width is changed. A change of data type thus cannot be caught, but this is rather unlikely as a model is modeled either in fixed point or floating point. In the case of floating point, the data width is always unchanged, even in FPGA. With the trend toward floating point in the FPGA domain, changes to input data types/widths will in future be rare in this context too.

To avoid having to generate black boxes again too often, which requires computing power in the background, global conditions that reduce the frequency can be specified for the callback functions. These conditions may be, for example, that the amount of time since the last regeneration of the black box B1.2 is longer than a particular number of minutes, the amount of time since the last change is longer than a particular number of minutes, the change frequency is lower than a particular value, or the number of changes exceeds a particular value. As a result of these conditions, the black box B1.2 may not be regenerated despite the change in the subsystem block S1.2, for example if the user only leaves the subsystem block S1.2 briefly and then changes the subsystem block S1.2 again.

In one example embodiment, a pushbutton can be inserted, which launches the regeneration of a black box B1.2 and of all the black boxes within that black box.

Figure 2:
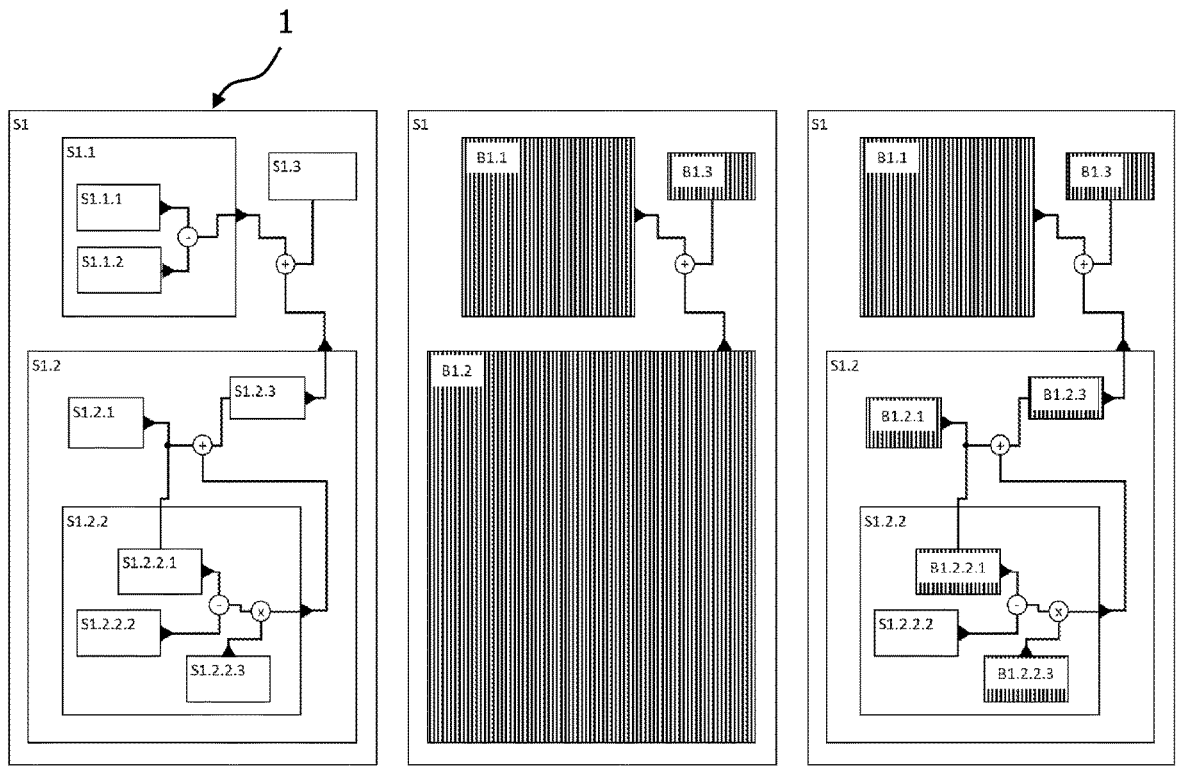
FIG. 2 shows block diagrams of an example subsystem, in which part a) shows the original model, part b) shows a model that has been reduced using black boxes, and part c) shows a hierarchically reduced model, in accordance with an example embodiment of the invention.

By way of example, FIG. 2 shows different stages of the model reduction. FIG. 2a) shows the original model composed of hierarchical subsystem blocks S1.1, S1.2, S1.3, etc. (visualized up to depth 4). In FIG. 2b), the model has been reduced entirely to black boxes/abstract blocks B1.1, B1.2, B1.3, etc. of depth 2. This may be the case, for example, if a user is not planning any further changes to said blocks but wishes to merely interconnect them, for example. FIG. 2c) shows an abstracted block S1, again partly resolved into its constituent parts in a plurality of hierarchical levels. The method reduces the subsystem blocks S1.1, S1.2, S1.3, etc., thereof automatically from the lowest level upward via the hierarchical black boxes B1.1, B1.2, B1.3, etc. As soon as a user wishes to work on a black box B1.1, B1.2, B1.3, etc., only the corresponding black box hierarchical level is resolved. In FIG. 2c), the user wanted to process the subsystem block 1.2.2.2, for example. Looking at FIG. 2b) from the above-mentioned perspectives, it is now clear that the three remaining black boxes B1.1, B1.2, B1.3 have been generated under the hood out of hierarchically interleaved black boxes B1.2.1, B1.2.3, B1.2.2.1, B1.2.2.3. As soon as the user opens one of the black boxes B1.1, B1.2, B1.3, etc., during graphical processing, a black box hierarchical level is resolved. In other words, the user arrives at FIG. 2c) from FIG. 2b) by having first opened black box 1.2, then black box 1.2.2 and then black box 1.2.2.2 in order to work on subsystem 1.2.2.2. Consequently, the number of resolved black boxes B1.1, B1.2, B1.3, etc., remains at a minimum, a fluid workflow is possible at all times, and when the black box 1.2 is created again only the edited subsystem 1.2.2.2 has to be synthesized/compiled again since all the black boxes are only ever included/linked hierarchically up to the uppermost black box level 1.2.

All the features explained in connection with individual embodiments of the invention can be combined in different ways in the subject matter according to the invention while simultaneously realizing their advantageous effects, even if they have been described in relation to different embodiments.

The scope of protection of the present invention is provided by the claims and is not limited by the features explained in the description or shown in the drawings.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

Block diagram 1
Black box creation 2
Black box resolution 3
Model root of subsystem 1 S1
Subsystem 1.1 S1.1
Subsystem 1.1.1 S1.1.1
Subsystem 1.1.2 S1.1.2
Subsystem 1.3 S1.3
Subsystem 1.2 S1.2
Subsystem 1.2.1 S1.2.1
Subsystem 1.2.2 S1.2.2
Subsystem 1.2.3 S1.2.3
Subsystem 1.2.2.1 S1.2.2.1
Subsystem 1.2.2.2 S1.2.2.2
Subsystem 1.2.2.3 S1.2.2.3
Black box 1.1 B1.1
Black box 1.2 B1.2
Black box 1.3 B1.3
Black box 1.2.1 B1.2.1
Black box 1.2.3 B1.2.3
Black box 1.2.2.1 B1.2.2.1
Black box 1.2.2.3 B1.2.2.3

The invention claimed is:

1. A computer-implemented method for creating a hierarchical block diagram in a graphical development environment comprising at least one subsystem block, in which the at least one subsystem block is located on a first hierarchical level and further subsystem blocks of the at least one subsystem block are located on subordinate hierarchical levels, wherein the at least one subsystem block is parameterizable and has at least one callback function, wherein callback functions define commands that are executed in response to particular modeling activities, wherein, to reduce hierarchical levels of the at least one subsystem block, at least one hierarchical black box is created for the at least one subsystem block, wherein a reduction is carried out from the lowest hierarchical level upward, and wherein the method comprises:

automatically creating a hierarchical black box for a respective further subsystem block, wherein the hierarchical black box is configured to resolve a corresponding hierarchical level when selected by a user, wherein the automatic creation is carried out via a callback function, and wherein the hierarchical black box has the following features:
at least one interface description and/or graphical representation of the inputs/outputs of the respective further subsystem block in its hierarchical level, which the respective further subsystem block previously also occupied;
at least one reference to model content for the respective further subsystem block, comprising further black boxes for the further subsystem blocks in the subordinate hierarchical levels;
parameters that the respective further subsystem block previously also had; and
generated source code of the respective further subsystem block.

2. The computer-implemented method according to claim 1, wherein automatically creating the hierarchical black box for the respective further subsystem block comprises:
generating the source code for the respective further subsystem block, wherein any wrapper code present around function code is removed; and
generating a system function block on the basis of the generated source code without any wrapper code, wherein the system function block enables access to system functions of the hierarchical block diagram, wherein the system functions specify how a block operates during different parts of a simulation, and wherein the system function block allows additional parameters to be directly transferred to the system functions.

3. The computer-implemented method according to claim 1, wherein the source code is hardware description language (HDL) code, and wherein automatically creating the hierarchical black box for the respective further subsystem block comprises creating an HDL code black box by:
replacing virtual signal lines with inports and outports, and shifting these ports from lower hierarchical levels to the uppermost subsystem hierarchical level of the respective further subsystem block, and/or replacing inports and outports of the uppermost subsystem hierarchical levels of the respective further subsystem block with interface blocks of the code generator being used;
generating HDL code for the respective further subsystem block; and
generating the hierarchical black box based on the HDL code.

4. The computer-implemented method according to claim 3, further comprising:
encrypting the HDL code.

5. The computer-implemented method according to claim 3, further comprising:
storing a network list, wherein the network list is synthesized from the generated HDL code, wherein the synthesis comprises:
generating a synthesized network list;
storing the synthesized network list; and
integrating the synthesized network list in the hierarchical black box, wherein the HDL code is also used for an offline simulation, and the synthesized network list is used for generating the HDL code.

6. The computer-implemented method according to claim 5, further comprising:
encrypting the network list.

7. The computer-implemented method according to claim 1, wherein the hierarchical black box contains a reference to an implementation.

8. The computer-implemented method according to claim 1, wherein the hierarchical black box comprises an original model, or the hierarchical black box comprises a created and referenced copy of the original model; and
wherein the method further comprises:
opening a further subsystem block via an opening callback function; and
restoring and displaying an editable original model of an uppermost black box hierarchical level.

9. The computer-implemented method according to claim 1, wherein the hierarchical black box contains an offline simulation model.

10. The computer-implemented method according to claim 1, wherein the hierarchical black box comprises, as parameters, a change frequency and/or a number of changes made.

11. The computer-implemented method according to claim 1, further comprising:
regenerating the hierarchical black box based on at least one of the following conditions being satisfied:
it is detected in the model that individual subsystem blocks have not yet been reduced in the event of an opening callback function or closing callback function;
it is established that the respective further subsystem block has been modified while a subsystem block is being closed via a closing callback function;
library blocks that have been used in hierarchical black boxes are updated; or
input data types and/or input widths are changed.

12. The computer-implemented method according to claim 11, wherein global conditions are taken into account in the callback functions in order to reduce the frequency of regenerations, wherein a regeneration is carried out further based on at least one of the following global conditions being fulfilled:
an amount of time since a last regeneration of the hierarchical black box is longer than a particular amount of time;
an amount of time since a last change is longer than a particular amount of time;
a change frequency is lower than a particular value; or
a number of changes exceeds a particular value.

13. A data processing device, comprising:
a processor; and
a memory having processor-executable instructions stored thereon;
wherein the processor is configured to execute the processor-executable instructions to facilitate the data processing device performing a method for creating a hierarchical block diagram in a graphical development environment comprising at least one subsystem block, in which the at least one subsystem block is located on a first hierarchical level and further subsystem blocks of the at least one subsystem block are located on subordinate hierarchical levels, wherein the at least one subsystem block is parameterizable and has at least one callback function, wherein callback functions define commands that are executed in response to particular modeling activities, wherein, to reduce hierarchical levels of the at least one subsystem block, at least one hierarchical black box is created for the at least one subsystem block, wherein a reduction is carried out from the lowest hierarchical level upward, and wherein the method comprises:
automatically creating a hierarchical black box for a respective further subsystem block, wherein the hierarchical black box is configured to resolve a corresponding hierarchical level when selected by a user, wherein the automatic creation is carried out via a callback function, and wherein the hierarchical black box has the following features:
at least one interface description and/or graphical representation of the inputs/outputs of the respective further subsystem block in its hierarchical level, which the respective further subsystem block previously also occupied;
at least one reference to model content for the respective further subsystem block, comprising further black boxes for the further subsystem blocks in the subordinate hierarchical levels;
parameters that the respective further subsystem block previously also had; and
generated source code of the respective further subsystem block.

14. A non-transitory computer-readable medium having processor-executable instructions stored thereon for creating a hierarchical block diagram in a graphical development environment comprising at least one subsystem block, in which the at least one subsystem block is located on a first hierarchical level and further subsystem blocks of the at least one subsystem block are located on subordinate hierarchical levels, wherein the at least one subsystem block is parameterizable and has at least one callback function, wherein callback functions define commands that are executed in response to particular modeling activities, wherein, to reduce hierarchical levels of the at least one subsystem block, at least one hierarchical black box is created for the at least one subsystem block, wherein a reduction is carried out from the lowest hierarchical level upward, and wherein the processor-executable instructions, when executed, facilitate:
automatically creating a hierarchical black box for a respective further subsystem block, wherein the hierarchical black box is configured to resolve a corresponding hierarchical level when selected by a user, wherein the automatic creation is carried out via a callback function, and wherein the hierarchical black box has the following features:
at least one interface description and/or graphical representation of the inputs/outputs of the respective further subsystem block in its hierarchical level, which the respective further subsystem block previously also occupied;
at least one reference to model content for the respective further subsystem block, comprising further black boxes for the further subsystem blocks in the subordinate hierarchical levels;
parameters that the respective further subsystem block previously also had; and
generated source code of the respective further subsystem block.

* * * * *